US 011709836B2

(12) United States Patent
Prentice et al.

(10) Patent No.: US 11,709,836 B2
(45) Date of Patent: Jul. 25, 2023

(54) DATA FETCH ENGINE

(71) Applicant: S&P Global Inc., New York, NY (US)

(72) Inventors: Jason Prentice, Lexington, MA (US); Ian James, Stoneham, MA (US); Leo Shapiro, Acton, MA (US)

(73) Assignee: S&P Global Inc., New York, NY (US)

( * ) Notice: Subject to any disclaimer, the term of this patent is extended or adjusted under 35 U.S.C. 154(b) by 0 days.

(21) Appl. No.: 17/451,704

(22) Filed: Oct. 21, 2021

(65) Prior Publication Data

US 2023/0127966 A1 Apr. 27, 2023

(51) Int. Cl.
*G06F 16/2453* (2019.01)
*G06F 16/23* (2019.01)
*G06F 11/34* (2006.01)

(52) U.S. Cl.
CPC ...... *G06F 16/24544* (2019.01); *G06F 11/3428* (2013.01); *G06F 16/2393* (2019.01); *G06F 16/24535* (2019.01)

(58) Field of Classification Search
CPC ............ G06F 16/24544; G06F 11/3428; G06F 16/2393; G06F 16/24535
See application file for complete search history.

(56) References Cited

U.S. PATENT DOCUMENTS

| 11,093,492 | B1* | 8/2021 | Nair ................ G06F 16/24522 |
| 2013/0117326 | A1* | 5/2013 | De Smet et al. ..... G06F 9/4488 707/798 |
| 2013/0166568 | A1* | 6/2013 | Binkert et al. ......... G06F 16/81 707/769 |
| 2019/0222658 | A1* | 7/2019 | Park et al. ........... H04L 67/535 |
| 2019/0384863 | A1* | 12/2019 | Sirin et al. ............. G06N 20/00 |
| 2020/0192900 | A1* | 6/2020 | Sung et al. .......... G06F 16/152 |
| 2020/0409890 | A1* | 12/2020 | Bueb et al. ......... G06F 13/4027 |
| 2022/0050843 | A1* | 2/2022 | Hu et al. .......... G06F 16/24524 |

* cited by examiner

*Primary Examiner* — Mark D Featherstone
*Assistant Examiner* — Kweku William Halm
(74) *Attorney, Agent, or Firm* — Yee & Associates, P.C.

(57) ABSTRACT

A method, apparatus, system, and computer program code for retrieving data records. A set of static configuration objects is provided, including: a set of resources that describe available data items, and a set of views that express a serialized transformation of resources objects into a response. In response to receiving a data request, a computer system generates a data fetch execution plan from the set of resources and the set of views. The data fetch execution plan is generated using an executor adapted to a particular data store and set of performance requirements. The computer system retrieves the data records according to the data fetch execution plan.

18 Claims, 6 Drawing Sheets

DATA FETCH ENGINE

BACKGROUND

1. Field

The disclosure relates generally to an improved computer system and, more specifically, to a method, apparatus, computer system, and computer program product for retrieving data records.

2. Description of the Related Art

Databases are used to store information for an innumerable number of applications, including various commercial, industrial, technical, scientific, and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database.

In a publish-subscribe model, database queries typically return only a subset of the total database entries. The process of selecting messages for reception and processing is called filtering. Database entries are only returned if the attributes or content of those entries match constraints defined by the user in the query. Significant development efforts have been directed toward query optimization, whereby the execution of particular searches, or queries, is optimized in an automated manner to minimize the number of resources required to execute each query.

The primary task of a query optimizer is to choose the most efficient way to execute each database query, or request, passed to the database management system by a user. The output of an optimization process is typically referred to as an "execution plan," "access plan," or just "plan" and is frequently depicted as a tree graph. Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

An optimizer's job is often necessary and difficult because of the enormous number of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), and the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

SUMMARY

According to one embodiment of the present invention, a method provides for retrieving data records. A set of static configuration objects is provided, including: a set of resources that describe available data items, and a set of views that express a serialized transformation of resources objects into a response. In response to receiving a data request, a computer system generates a data fetch execution plan from the set of resources and the set of views. The data fetch execution plan is generated using an executor adapted to a particular data store and set of performance requirements. The computer system retrieves the data records according to the data fetch execution plan.

According to another embodiment of the present invention, a computer system comprises a hardware processor, and a data fetch engine in communication with the hardware processor. Wherein data fetch engine is configured: in response to receiving a data request, to generate a data fetch execution plan from a set of static configuration objects including a set of resources that describe available data items and a set of views that express a serialized transformation of resources objects into a response, wherein the data fetch execution plan is generated by an executor adapted to a particular data store and set of performance requirements; and to retrieve the data records according to the data fetch execution plan.

According to yet another embodiment of the present invention, a computer program product comprises a computer-readable storage media with program code stored on the computer-readable storage media for retrieving data records. The program code comprises: code for providing a set of static configuration objects including a set of resources that describe available data items, and a set of views that express a serialized transformation of resources objects into a response; code for generating, in response to receiving a data request, a data fetch execution plan from the set of resources and the set of views, wherein the data fetch execution plan is generated by an executor adapted to a particular data store and set of performance requirements; and code for retrieving the data records according to the data fetch execution plan.

DETAILED DESCRIPTION

Thus, the illustrative embodiments recognize and take into account that it would be desirable to have a method, apparatus, computer system, and computer program product that takes into account the issues discussed above as well as other possible issues. For example, it would be desirable to have a method, apparatus, computer system, and computer program product that enable static introspectability, optimizations, and reusability of data fetch execution plans adapted to a particular data store and set of performance requirements.

In one illustrative example, a computer system is provided for retrieving data records. A set of static configuration objects is provided, including: a set of resources that describe available data items, and a set of views that express a serialized transformation of resources objects into a response. In response to receiving a data request, a computer system generates a data fetch execution plan from the set of resources and the set of views. The data fetch execution plan is generated using an executor adapted to a particular data store and set of performance requirements. The computer system retrieves the data records according to the data fetch execution plan.

Figure 1:
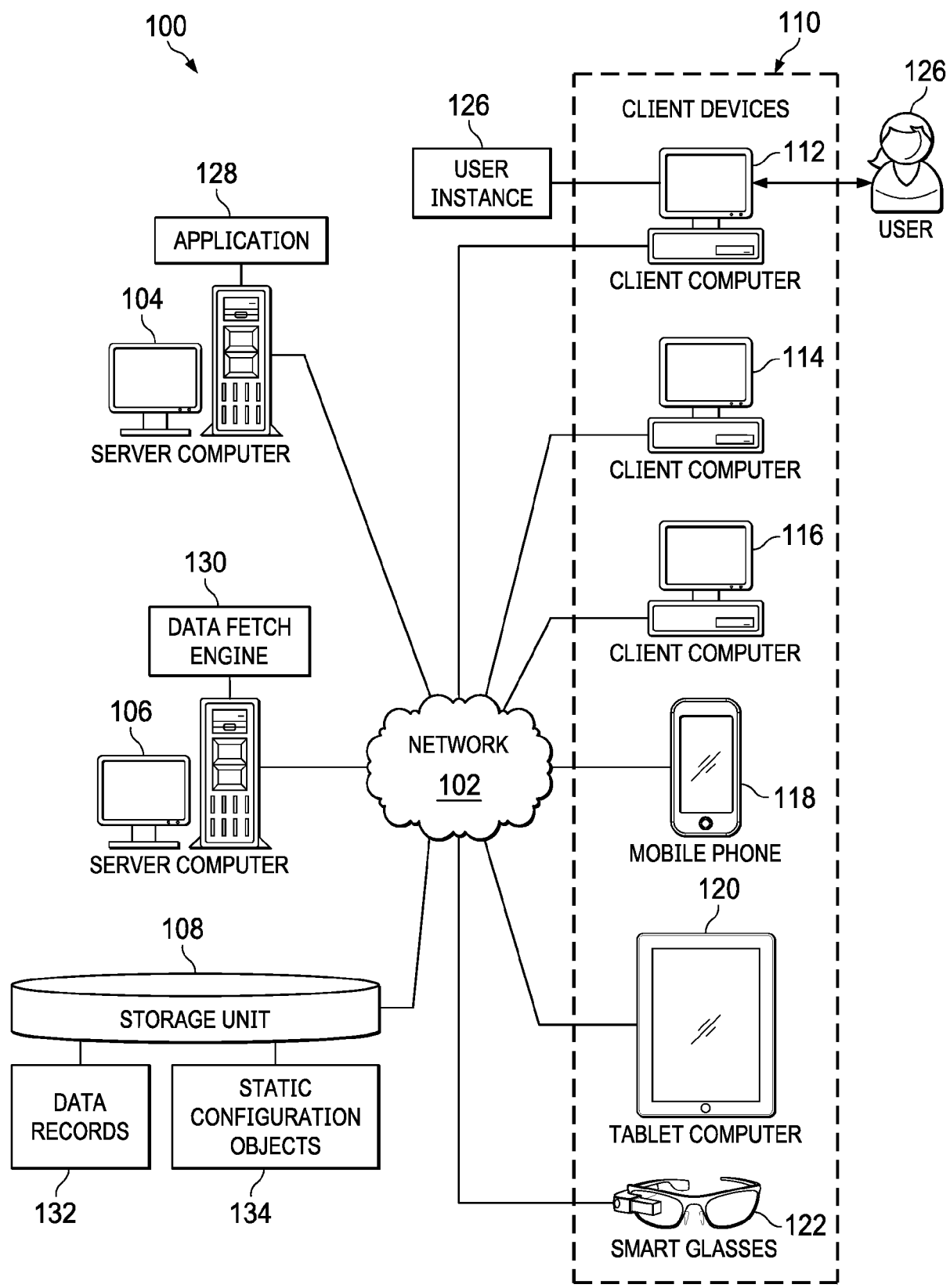
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, user 124 operates client computer 112. As depicted, user instance 126 of an application 128 runs on client computer 114. User 124 can access data records 132 using user instance 126 of the application 128. In the illustrative example, data fetch engine 130 can retrieve data records 132 in response to a request, such as a query, from user instance 126 of application 128.

In this illustrative example, data fetch engine 130 can run on client computer 114 and can take the form of a system instance of the application. In another illustrative example, data fetch engine 130 can be run in a remote location such as on server computer 104. In yet other illustrative examples, data fetch engine 130 can be distributed in multiple locations within network data processing system 100. For example, data fetch engine 130 can run on client computer 112 and on client computer 114 or on client computer 112 and server computer 104 depending on the particular implementation.

Data fetch engine 130 can operate to retrieve data records by utilizing static configuration objects 134. Data fetch engine 130 solves the problem of retrieving records from multiple tables across multiple data stores, apply joins and transformations to them, and then render the result as a serialized response. Data fetch engine 130 is capable of handling a complex regime where potentially hundreds of interlinked backing tables need to be queried to generate a response.

Data fetch engine 130 decouples the representation of the data flow and data transformations from the underlying data fetch execution strategy, thereby facilitating ease-of-use and maintainability by developers. The decoupled design of data fetch engine 130 allows data dependencies and metadata to be fully mapped and queried via automated tools. Additionally, the decoupled design allows for construction of code that cleanly expresses the logic of data structures and data transformations without details related to data fetch or explicit performance optimization.

Data fetch engine 130 represents the decoupled data flow graph as static configuration object 134 which can be stored, retrieved, introspected, or mutated. Because these static configuration objects 134 are decoupled from the underlying data fetch execution strategy, static configuration object allow a single "logical" description of data fetch and transformation to be reused in different applications that may require different performance characteristics. These static configuration objects 134 can be used to inform automated performance optimizations.

Figure 2:
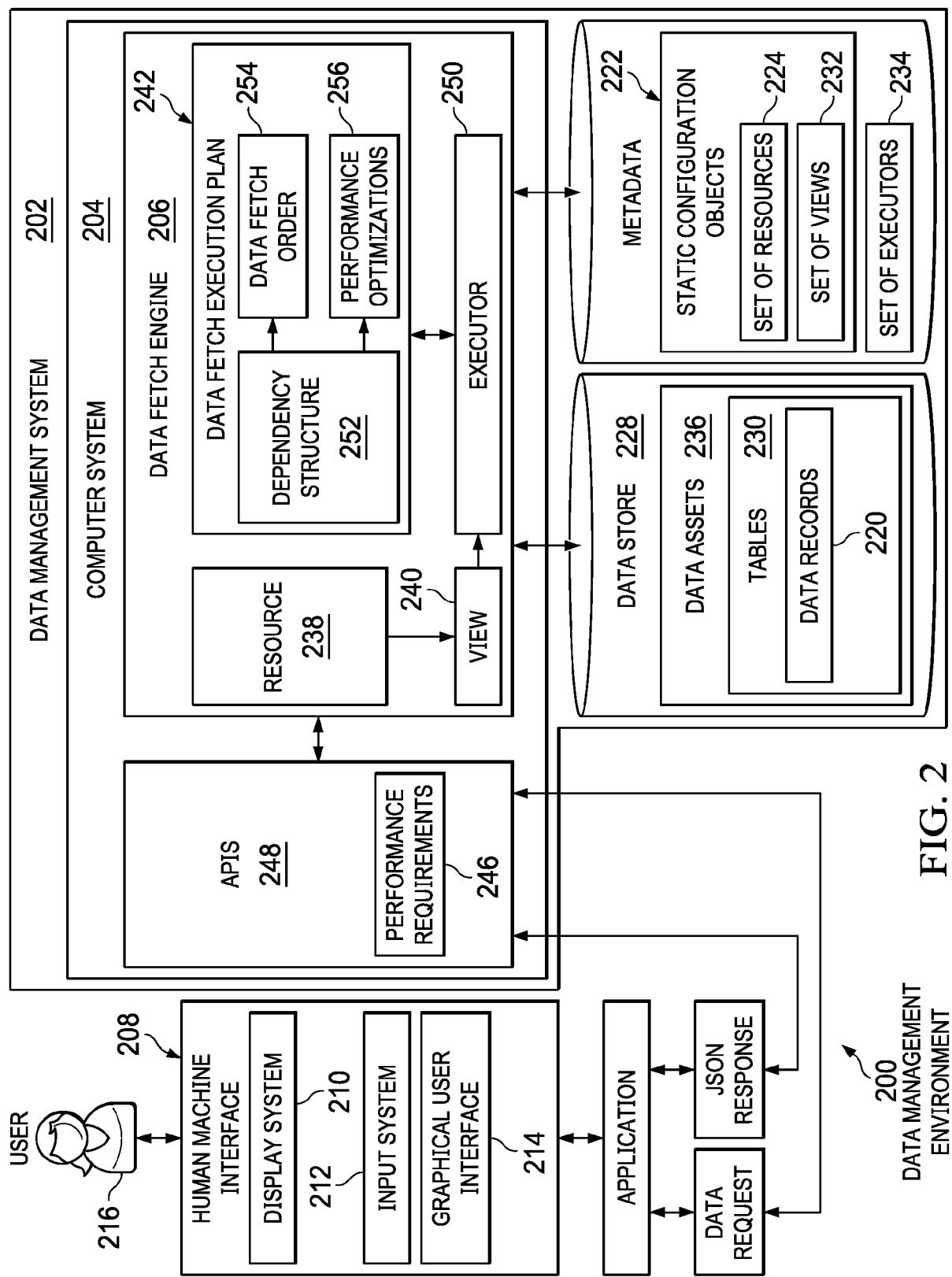
FIG. 2 is a block diagram of a data management environment in accordance with an illustrative embodiment.

With reference now to FIG. 2, a block diagram of a data management environment is depicted in accordance with an illustrative embodiment. In this illustrative example, data management environment 200 includes components that can be implemented in hardware such as the hardware shown in network data processing system 100 in FIG. 1.

As depicted, data management system 202 comprises computer system 204 and data fetch engine 206. Data fetch engine 206 runs in computer system 204. Data fetch engine 206 can be implemented in software, hardware, firmware, or a combination thereof. When software is used, the operations performed by data fetch engine 206 can be implemented in program code configured to run on hardware, such as a processor unit. When firmware is used, the operations performed by data fetch engine 206 can be implemented in program code and data and stored in persistent memory to run on a processor unit. When hardware is employed, the hardware may include circuits that operate to perform the operations in data fetch engine 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 216 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, human machine interface 208 can enable user 216 to interact with one or more computers or other types of computing devices in computer system 204. For example, these computing devices can be client devices such as client devices 110 in FIG. 1.

In this illustrative example, data fetch engine 206 in computer system 204 is configured to retrieve data records 220. Data retrieval is enabled by providing a set of static configuration objects 222.

Static configuration objects 222 includes a set of resources 224. Set of resources 224 are configuration objects that describe available data assets 226. This description can include, for example, but not limited to, an identification of data store 228, table 230, and field names; together with optional scoping conditions and foreign key relations (i.e., associations). In short, resources describe "where" the data lives.

Static configuration objects 222 includes a set of views 232. Set of views 232 are configuration objects that that express a serialized transformation of one or more resource in set of resources 224 into response. Set of views 232 express navigation across linked data assets 226 according to associations described in set of resources 224. In short, Views describe "what" data is required and how that data will be transformed.

The data structures underlying set of views 232 are represented internally as a static object. In this manner, set of views 232 provides a domain-specific language (DSL) for expressing a transformation from set of resources 224 into a response object, such as a JSON object. In contrast to a more standard "eager-mode" evaluation strategy where each sub-object of a response is evaluated independently, the declarative style utilized by set of views 232 enables introspectability, optimizations, and reusability of the static configuration objects 222 among different ones of set of executors 234.

In one illustrative example, data fetch engine 206 can generate static configuration objects 222 in response to receiving a query. For example, upon receiving query, data fetch engine 206 parses a projection and predicate structure of the received SQL statement to identify one or more queried data assets 236. Data fetch engine 206 then generates a resource 238 that describes the data assets 226 that were requested, and stores resource 238 as one of the set of resources 224. Using that newly generated resource 238, data fetch engine 206 generates view 240 that expresses a serialized transformation of resource 238 into a response; and stores view 240 as one of the set of 232.

For example, data fetch engine 206 may apply a set of joins and transformations to the data records according to the projections and predicate structure of the received SQL statement, as described in resource 238. Data fetch engine 206 generating the view 240 as a JSON response that serializes the set of joins and transformations.

In response to receiving a data request, data fetch engine 206 generates a data fetch execution plan 242 from the set of resources 224 and the set of views 232. The data fetch execution plan 242 is generated by an executor 244 adapted to a particular data store 228 and performance requirements 246 of application programming interface 248.

Set of executors 234 are responsible for "how" to get the requested data, and contain the logic to interact with specific data stores. Set of executors 234 takes a set of views 232 and set of resources 224 as input, and develops data fetch execution plan 242 adapted to a particular data store 228 and set of performance requirements 246.

The set of resources 224 and the set of views 232 are universally usable by different executors. Data fetch engine 206 can interchangeably combine different executors views and resources. This interchangeability enables separate logical descriptions of data fetch execution and data transformation to be reused in different products having different performance characteristics.

Data fetch engine 206 retrieving the data records 220 according to the data fetch execution plan 242. In one illustrative example, according to the view 240, data fetch engine 206 uses the executor 250 to derive a dependency structure 252 that describes data dependencies among interlinked backing tables that need to be queried to generate a response. Data fetch engine 206 can then use the dependency structure to determine a data fetch order 254 and a set of performance optimizations 256. Data fetch engine 206 generates the data fetch execution plan 242 according to the data fetch order 2154 and set of performance optimizations 256.

For example, in one illustrative example, data fetch engine 206 may apply a performance optimization 256 that fetches data from a SQL database, generates a single SQL query for each table that the View depends on, and coordinates execution of these queries via the dependency structure 252.

In one illustrative example, data fetch engine 206 may apply a performance optimization 256 that generates a single SQL query which includes joins across all required tables 230. In another illustrative example, data fetch engine 206 may apply a performance optimization 256 that returns data from a data store 228 in a stream instead of a single batch.

In one illustrative example, one or more solutions are present that overcome a problem with retrieving records from multiple tables across multiple data stores, apply joins and transformations to them, and then render the result as a serialized response. As a result, one or more illustrative examples may operate to retrieve data records by utilizing static configuration objects. Data fetch engine 130 decouples the representation of the data flow and data transformations from the underlying data fetch execution strategy, thereby facilitating ease-of-use and maintainability by developers. Data fetch engine 130 represents the decoupled data flow graph as a static configuration object which can be stored, retrieved, introspected, or mutated.

The decoupled design of data fetch engine 130 allows for construction of code that cleanly expresses the logic of data structures and data transformations without details related to data fetch or explicit performance optimization. Because these static configuration objects are decoupled from the underlying data fetch execution strategy, static configuration object allow a single "logical" description of data fetch and transformation to be reused in different applications that may require different performance characteristics.

Additionally, the decoupled design allows data dependencies and metadata to be fully mapped and queried via automated tools. The static configuration objects can be used to inform automated performance optimizations.

Computer system 204 can be configured to perform at least one of the steps, operations, or actions described in the different illustrative examples using software, hardware, firmware, or a combination thereof. As a result, computer system 204 operates as a special purpose computer system in data fetch engine 206 in computer system 204. In particular, data fetch engine 206 transforms computer system 204 into a special purpose computer system as compared to currently available general computer systems that do not have data fetch engine 206. In this example, computer system 204 operates as a tool that can increase at least one of speed, accuracy, or usability of computer system 204.

The illustration of data management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
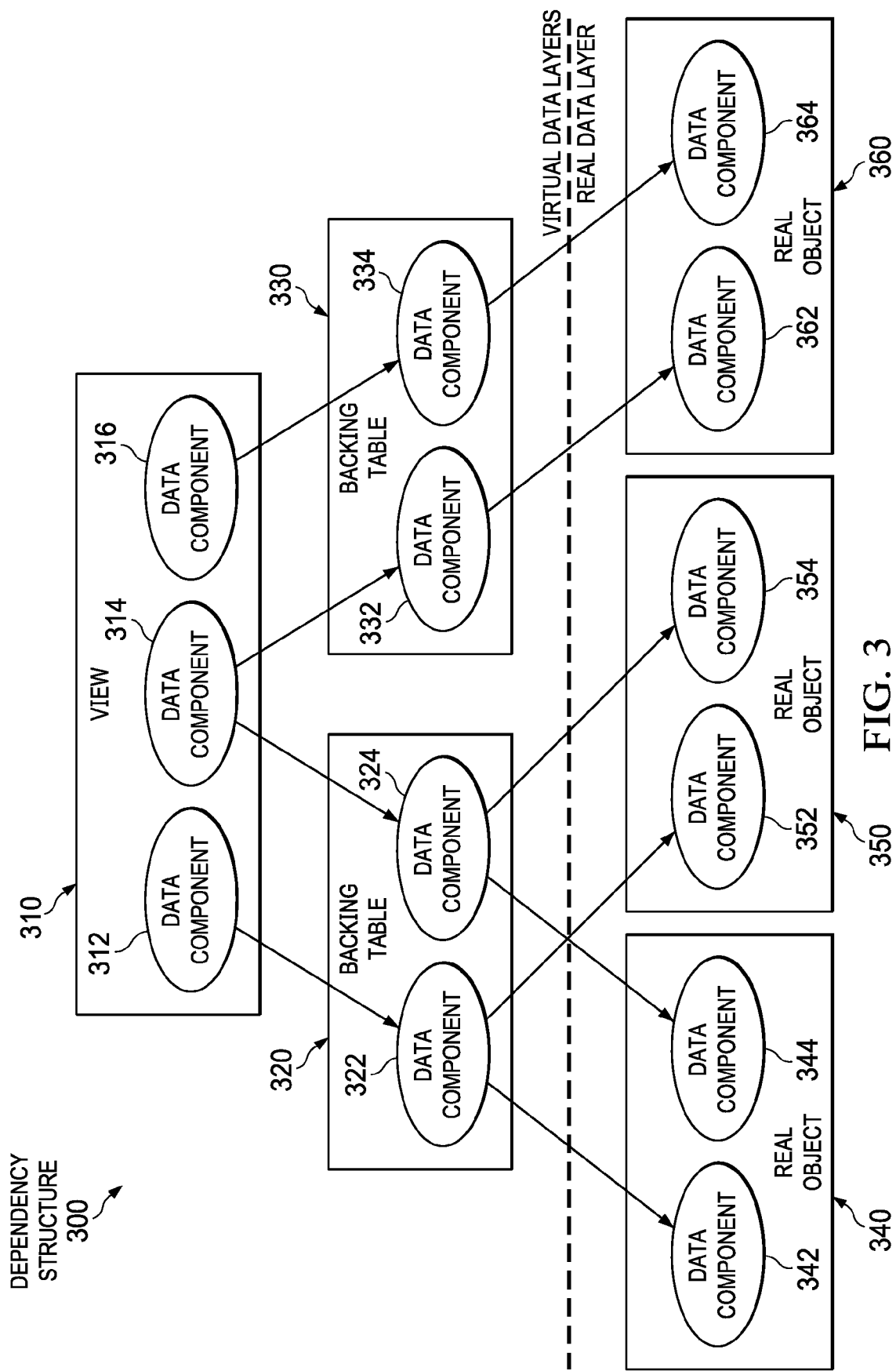
FIG. 3 is a diagram illustrating an example of a dependency structure depicted in accordance with an illustrative embodiment.

With reference now to FIG. 3, a diagram illustrating an example of a dependency structure is depicted in accordance with an illustrative embodiment. Dependency structure 300 is one example of a set of a data structure that captures data provenance relationships between data assets, such as dependency structure 252 of FIG. 2.

Dependency structure 300, also sometimes referred to as a "data provenance graph," captures the relationships between the data assets as well as their components from the abstract layers, such as view 310 and backing tables 320, 330, down to the source data, such as real objects 340, 350, and 360. Dependency structure 300 represents data assets as a set of connected objects. In one illustrative example, Dependency structure 300 is a directed acyclic graph that models data assets as nodes and edges establishing relationship. For example, for a graph node representing a virtualized table, the adjacent upstream nodes will be the data assets of the source tables it is virtualized over.

Each data component of the virtual data layers ultimately traces to a data component in the real data layer. For example, as depicted, data component 312 maps to data component 322, which in turn maps to data components 342, 352. Data component 314 maps to data components 324 and 332, which in turn map to data components 344, 354, and data component 362, respectively. Data component 316 maps to data component 334, which in turn maps to data component 364.

The relationship type that applies to the projection is to be captured in the form of edges that connect the data components. Edges between nodes represent data provenance relationships between the data components. For example, an edge connecting two nodes indicates a relationship between those data components. For example, each column of a backing table can be represented by a node in the graph. Edges connect columns of the backing table to referenced columns in a real object. Edges may also capture a relationship type that applies to the projection. For example, edges may indicate whether a resulting column of a virtual table is a projection, sum, join, or group, of source columns.

When a data asset is accessed, for example in a query, data assets, as well as their data components, are identified by projecting the predicate structure of the received SQL statement. For example, a query of view 310 may reference data component 312. View 310 is projected through backing table 320, down to real objects 340, 350, that ultimately identifies data components 342, 352.

Figure 4:
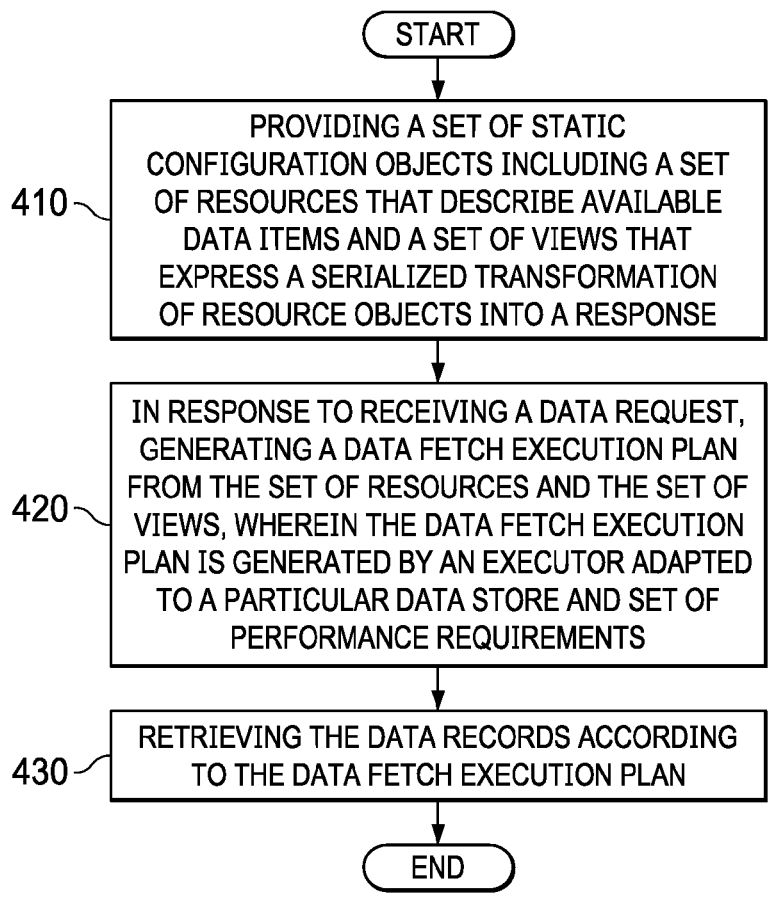
FIG. 4 is a flowchart of a process for retrieving data records depicted in accordance with an illustrative embodiment.

Turning next to FIG. 4, a flowchart of a process for retrieving data records is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in data fetch engine 206 in computer system 204 in FIG. 2.

The process begins by providing a set of static configuration objects including a set of resources that describe available data items, and a set of views that express a serialized transformation of resources objects into a response (step 410). The static configuration objects can be, for example, static configuration objects 222 of FIG. 2. Each view and resource is interchangeably usable by a set of executors, enabling separate logical descriptions of data fetch execution and data transformation to be interchangeably reused in different products having different performance characteristics.

In response to receiving a data request, the process generates a data fetch execution plan from the set of resources and the set of views, wherein the data fetch execution plan is generated by an executor adapted to a particular data store and set of performance requirements (step 420). The performance requirements can be indicated in a particular application programming interface, such as one of application programming interface 248 of FIG. 2.

The process retrieves the data records according to the data fetch execution plan (step 430). The process terminates thereafter.

Figure 5:
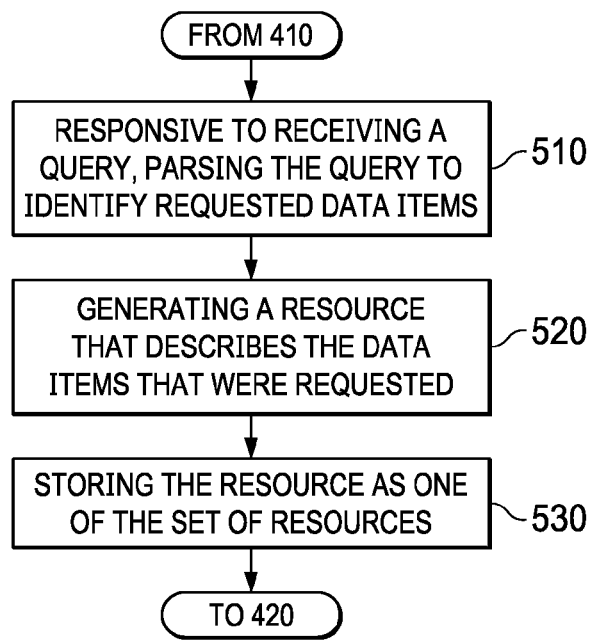
FIG. 5 is a flowchart of a process for generating a resource depicted in accordance with an illustrative embodiment.

With reference next to FIG. 5, a flowchart of a process for generating a resource is depicted in accordance with an illustrative embodiment. The process in FIG. 5 can be implemented in conjunction with process 400 of FIG. 4.

Continuing from step 410 of FIG. 4, responsive to receiving a query, the process parses the query to identify requested data items (start 510). The process generates a resource that describes the data items that were requested (step 520). The process storing the resource as one of the set of resources (step 530). Thereafter, the process can continue to step 420 of FIG. 4.

Figure 6:
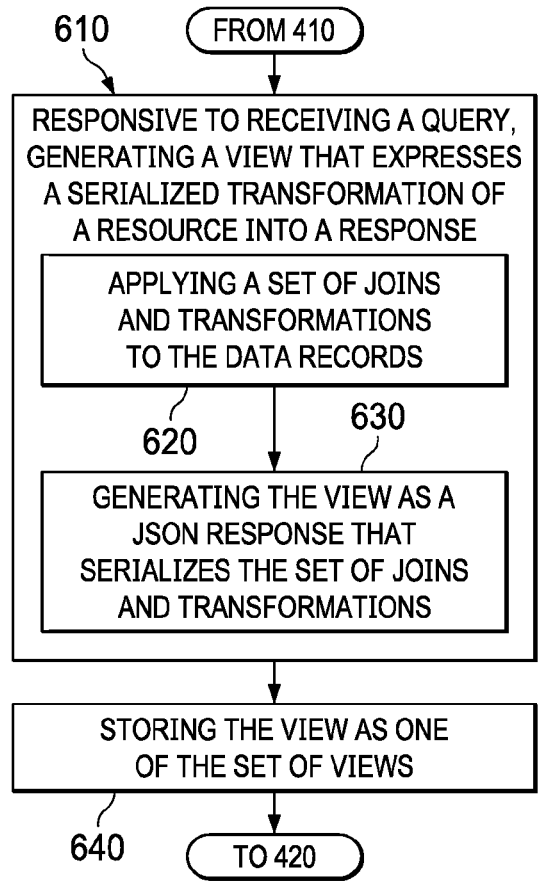
FIG. 6 is a flowchart of a process for generating a resource depicted in accordance with an illustrative embodiment.

With reference next to FIG. 6, a flowchart of a process for generating a resource is depicted in accordance with an illustrative embodiment. The process in FIG. 6 can be implemented in conjunction with process 400 of FIG. 4.

Continuing from step 410 of FIG. 4, responsive to receiving a query, the process generates a view that express is a serialized transformation of a resource into a response (step 610). For example, in one illustrative embodiment, the process may apply a set of joins and transformations to the data records (step 620) and generates the view as a JSON response that serializes the set of joins and transformations (step 630).

The process storing the view as one of the set of resources (step 530). Thereafter, the process can continue to step 420 of FIG. 4.

Figure 7:
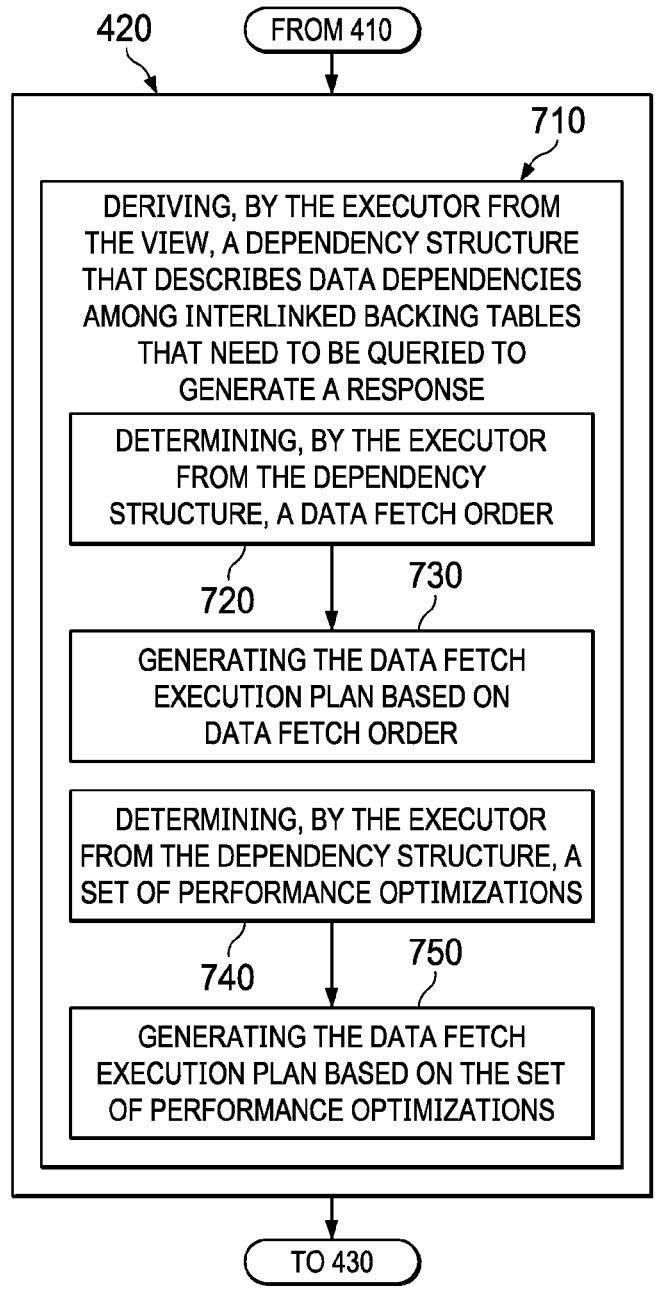
FIG. 7 is a flowchart of a process for generates a data fetch execution plan depicted in accordance with an illustrative embodiment.

With reference next to FIG. 7, a flowchart of a process for generating a data fetch execution plan is depicted in accordance with an illustrative embodiment. The process in FIG. 7 is an example one implementation for step 420 in FIG. 4.

Continuing from step 410, the process derives, by the executor from the view, a dependency structure that describes data dependencies among interlinked backing tables that need to be queried to generate a response (step 710). Thereafter, the process continues to step 420 of FIG. 4.

In one illustrative example, the process includes determining, by the executor from the dependency structure, a data fetch order (step 720). The process then generates the data fetch execution plan based on data fetch order (step 730).

In one illustrative example, the process includes determining, by the executor from the dependency structure, a set of performance optimizations (step 740). The process then generates the data fetch execution plan based on the set of performance optimizations (step 750). Thereafter, the process continues to step 420 of FIG. 4.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
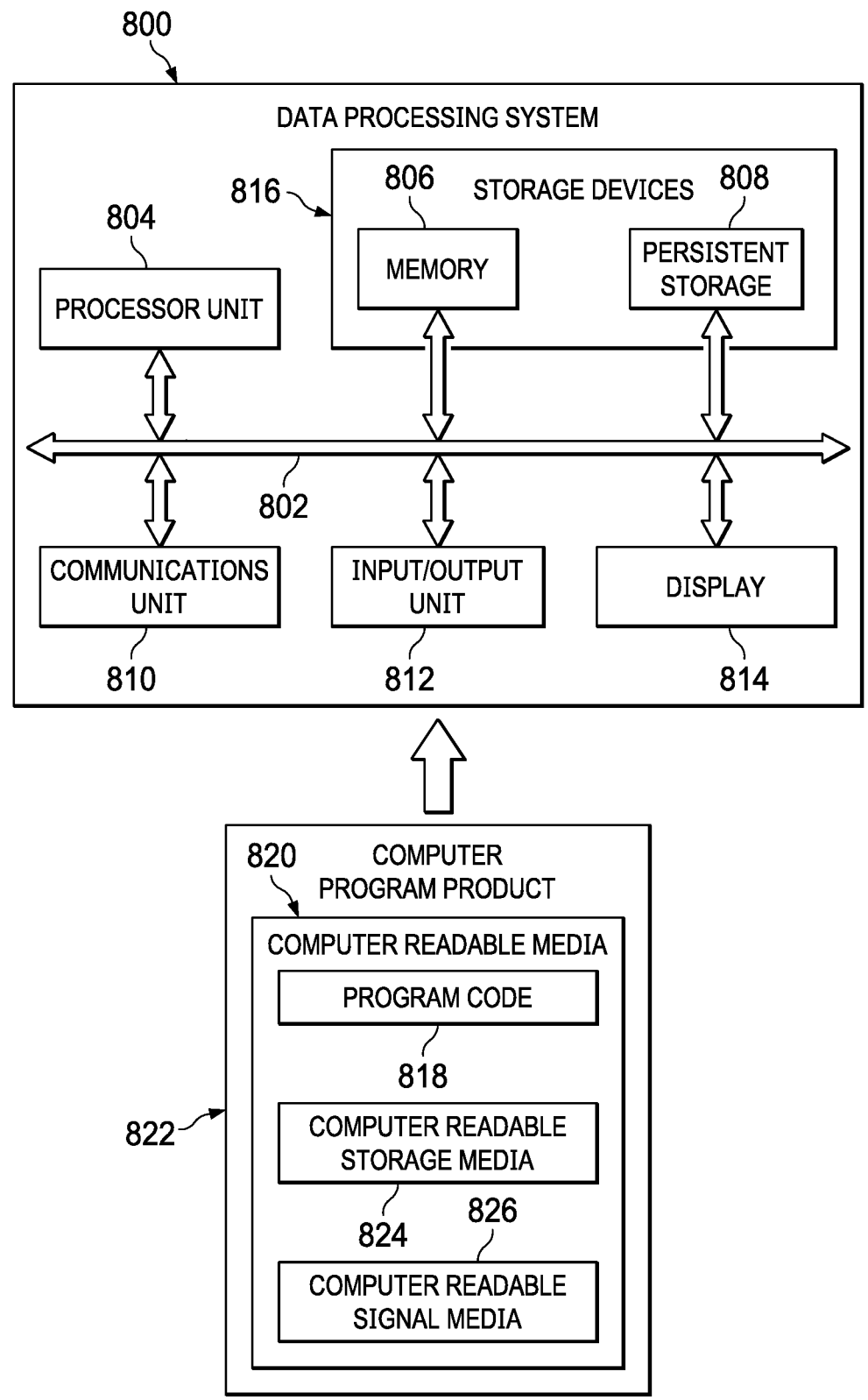
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement server computer 104, server computer 106, client devices 110, in FIG. 1. Data processing system 800 can also be used to implement computer system 204 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are program instructions and are also referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media X124 is a physical or tangible storage device used to store program code X118 rather than a medium that propagates or transmits program code X118. Computer-readable storage media X124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 818 can be transferred to data processing system 800 using a computer-readable signal media. The computer-readable signal media are signals and can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in program code 818 can be located in one data processing system. For example, a portion of program code 818 can be located in computer-readable media 820 in a server computer while another portion of program code 818 can be located in computer-readable media 820 located in a set of client computers.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for retrieving data records, comprising:
providing a set of static configuration objects including:
a set of resources that describe available data items; and
a set of views that express a serialized transformation of resources objects of the set of resources into a response;
in response to receiving a data request, generating a data fetch execution plan from the set of resources and the set of views, comprising:
deriving, by executor from a view stored in the set of views, a dependency structure that captures data provenance relationships and describes data dependencies among interlinked backing tables that need to be queried to generate a response;
determining, by the executor from the dependency structure, a data fetch order; and
generating the data fetch execution plan based on data fetch order, wherein the set of performance optimizations are selected from:
a first optimization that fetches data from a SQL database, generates a single SQL query for each table that the view depends on, and coordinates execution of these queries via the dependency structure;
a second optimization that generates a single SQL query which includes joins across all required tables; and
a third optimization that returns data from a data store in a stream instead of a single batch;
wherein the data fetch execution plan is generated by an executor from a set of executors, wherein each executor of the set of executors is adapted to a particular data store and set of performance requirements, and wherein views and resources of different executors of the set of executors can be interchangeably combined; and
retrieving the data records according to the data fetch execution plan.

2. The method of claim 1, further comprising:
responsive to receiving a query, parsing the query to identify requested data items;
generating a resource that describes the data items that were requested; and
storing the resource as one of the set of resources.

3. The method of claim 1, further comprising:
responsive to receiving a query, generating a view that expresses a serialized transformation of a resource into a response; and
storing the view as one of the set of views.

4. The method of claim 3, wherein generating the view further comprises:
applying a set of joins and transformations to the data records; and
generating the view as a JSON response that serializes the set of joins and transformations.

5. The method of claim 1, wherein the set of resources and the set of views are universally usable by the set of executors for a set of applications, enables separate logical descriptions of data fetch execution and data transformation to be reused in different products having different performance characteristics.

6. The method of claim 1, further comprising:
determining, by the executor from the dependency structure, a data fetch order; and
generating the data fetch execution plan based on data fetch order.

7. A computer system comprising:
a hardware processor; and
a data fetch engine, in communication with the hardware processor, for retrieving data records, wherein data fetch engine is configured:
in response to receiving a data request, to generate a data fetch execution plan from a set of static configuration objects including a set of resources that describe available data items and a set of views that express a serialized transformation of resources objects into a response, comprising:
deriving, by executor from a view stored in the set of views, a dependency structure that captures data provenance relationships and describes data dependencies among interlinked backing tables that need to be queried to generate a response;
determining, by the executor from the dependency structure, a data fetch order; and
generating the data fetch execution plan based on data fetch order, wherein the set of performance optimizations are selected from:
a first optimization that fetches data from a SQL database, generates a single SQL query for each table that the view depends on, and coordinates execution of these queries via the dependency structure;
a second optimization that generates a single SQL query which includes joins across all required tables; and
a third optimization that returns data from a data store in a stream instead of a single batch;
wherein the data fetch execution plan is generated by an executor from a set of executors, wherein each executor of the set of executors is adapted to a particular data store and set of performance requirements, and wherein views and resources of different executors of the set of executors can be interchangeably combined; and to retrieve the data records according to the data fetch execution plan.

8. The computer system of claim 7, wherein the data fetch engine is further configured:
responsive to receiving a query, to parse the query to identify requested data items;
to generate a resource that describes the data items that were requested; and
to store the resource as one of the set of resources.

9. The computer system of claim 7, wherein the data fetch engine is further configured:
responsive to receiving a query, to generate a view that expresses a serialized transformation of a resource into a response; and
to store the view as one of the set of views.

10. The computer system of claim 9, wherein in generating the view, the data fetch engine is further configured:
to apply a set of joins and transformations to the data records; and
to generate the view as a JSON response that serializes the set of joins and transformations.

11. The computer system of claim 7, wherein the set of resources and the set of views are universally usable by the set of executors for a set of applications, enables separate logical descriptions of data fetch execution and data transformation to be reused in different products having different performance characteristics.

12. The computer system of claim 7, wherein the data fetch engine is further configured:
to determine, by the executor from the dependency structure, a data fetch order; and
to generate the data fetch execution plan based on data fetch order.

13. A computer program product comprising:
a computer readable storage media; and
program code, stored on the computer readable storage media, for retrieving data records, the program code comprising:
code for providing a set of static configuration objects including:
a set of resources that describe available data items; and
a set of views that express a serialized transformation of resources objects of the set of resources into a response;
code for generating, in response to receiving a data request, a data fetch execution plan from the set of resources and the set of views, comprising:
code for deriving, by executor from a view stored in the set of views, a dependency structure that captures data provenance relationships and describes data dependencies among interlinked backing tables that need to be queried to generate a response;
code for determining, by the executor from the dependency structure, a set of performance optimizations; and
code for generating the data fetch execution plan based on the set of performance optimizations, wherein the set of performance optimizations are selected from:
a first optimization that fetches data from a SQL database, generates a single SQL query for each table that the view depends on, and coordinates execution of these queries via the dependency structure;
a second optimization that generates a single SQL query which includes joins across all required tables; and
a third optimization that returns data from a data store in a stream instead of a single batch;
wherein the data fetch execution plan is generated by an executor from a set of executors, wherein each executor of the set of executors is adapted to a particular data store and set of performance requirements, and wherein views and resources of different executors of the set of executors can be interchangeably combined; and
code for retrieving the data records according to the data fetch execution plan.

14. The computer program product of claim 13, wherein the program code further comprises:
code for parsing, responsive to receiving a query, the query to identify requested data items;
code for generating a resource that describes the data items that were requested; and
code for storing the resource as one of the set of resources.

15. The computer program product of claim 13, wherein the program code further comprises:
code for generating, responsive to receiving a query, a view that expresses a serialized transformation of a resource into a response; and
code for storing the view as one of the set of views.

16. The computer program product of claim 15, wherein the code for generating the view further comprises:
code for applying a set of joins and transformations to the data records; and
code for generating the view as a JSON response that serializes the set of joins and transformations.

17. The computer program product of claim 13, wherein the set of resources and the set of views are universally usable by the set of executors, enables separate logical descriptions of data fetch execution and data transformation to be reused in different products having different performance characteristics.

18. The computer program product of claim 13, further comprising:
code for determining, by the executor from the dependency structure, a data fetch order; and
code for generating the data fetch execution plan based on data fetch order.

* * * * *